(12) United States Patent
Adibhatla (10) Patent No.: US 8,478,473 B2
(45) Date of Patent: Jul. 2, 2013

(54) METHOD AND SYSTEMS FOR CONTROLLING GAS TURBINE ENGINE TEMPERATURE

(75) Inventor: Sridhar Adibhatla, Glendale, OH (US)

(73) Assignee: General Electric Company, Schenectady, NY (US)

( * ) Notice: Subject to any disclaimer, the term of this patent is extended or adjusted under 35 U.S.C. 154(b) by 1098 days.

(21) Appl. No.: 12/181,079

(22) Filed: Jul. 28, 2008

(65) Prior Publication Data
US 2010/0023238 A1 Jan. 28, 2010

(51) Int. Cl.
*G01M 15/14* (2006.01)
(52) U.S. Cl.
USPC ........... 701/29.1; 701/30.2; 701/32.9; 60/277
(58) Field of Classification Search
USPC ................. 701/29, 100–102, 107, 29.1, 29.2, 701/29.7, 30.2, 30.5, 30.6, 30.9, 31.5, 32.9; 73/112.01; 60/277; 703/7, 8
See application file for complete search history.

(56) References Cited

U.S. PATENT DOCUMENTS

| | | | |
|---|---|---|---|
| 4,039,804 A | 8/1977 | Reed et al. | |
| 4,259,835 A | 4/1981 | Reed et al. | |
| 4,541,386 A | 9/1985 | Kishi et al. | |
| 5,682,317 A * | 10/1997 | Keeler et al. | 701/101 |
| 6,076,510 A | 6/2000 | Kim | |
| 6,092,016 A * | 7/2000 | Sarangapani et al. | 701/102 |
| 6,272,427 B1 | 8/2001 | Wild et al. | |
| 6,463,380 B1 * | 10/2002 | Ablett et al. | 701/100 |
| 6,502,085 B1 * | 12/2002 | Adibhatla et al. | 706/52 |
| 6,532,412 B2 * | 3/2003 | Adibhatla et al. | 701/100 |
| 6,539,783 B1 * | 4/2003 | Adibhatla | 73/112.06 |
| 6,598,195 B1 * | 7/2003 | Adibhatla et al. | 714/745 |
| 6,862,514 B2 * | 3/2005 | Ehara | 701/102 |
| 6,873,902 B2 | 3/2005 | Welch | |
| 7,020,595 B1 * | 3/2006 | Adibhatla et al. | 703/7 |
| 7,305,825 B2 | 12/2007 | Ruiz et al. | |
| 7,379,799 B2 | 5/2008 | Cleary et al. | |
| 7,693,643 B2 * | 4/2010 | Kim et al. | 701/100 |
| 7,861,578 B2 * | 1/2011 | Adibhatla et al. | 73/112.01 |
| 7,908,072 B2 * | 3/2011 | Tonno et al. | 701/100 |
| 2002/0022911 A1 | 2/2002 | Sandberg et al. | |
| 2005/0107941 A1 * | 5/2005 | Healy | 701/100 |
| 2007/0047616 A1 | 3/2007 | Izumiura et al. | |
| 2007/0118270 A1 * | 5/2007 | Wiseman et al. | 701/100 |
| 2008/0154459 A1 * | 6/2008 | Grichnik et al. | 701/29 |
| 2008/0243354 A1 * | 10/2008 | Grichnik et al. | 701/102 |
| 2009/0094009 A1 * | 4/2009 | Muller | 703/7 |
| 2010/0250051 A1 * | 9/2010 | Nestico et al. | 701/33 |

* cited by examiner

*Primary Examiner* — Paul N Dickson
*Assistant Examiner* — James English
(74) *Attorney, Agent, or Firm* — David J. Clement, Esq.; Armstrong Teasdale LLP (57) ABSTRACT

A method and systems for controlling an engine are provided. The system includes an engine model programmed to receive engine operating condition values from a plurality of sensors on an engine. The engine model is programmed to determine a plurality of engine operating parameter values. The system also includes a processor configured to compare the operating parameter values to a predetermined allowable range for the operating parameter and control the operation of the engine to facilitate returning the determined operating parameter to the allowable range or maintaining the determined operating parameter within the allowable range, output the determined operating parameter values to a user, and/or generate maintenance requests based on the comparison.

20 Claims, 6 Drawing Sheets

METHOD AND SYSTEMS FOR CONTROLLING GAS TURBINE ENGINE TEMPERATURE

STATEMENT REGARDING FEDERALLY SPONSORED RESEARCH & DEVELOPMENT

The U.S. Government has certain rights in this invention as provided for by the terms of Contract No. N00019-04-C-0093.

BACKGROUND OF THE INVENTION

This invention relates generally to gas turbine engines and, more particularly, to determining operating parameters for controlling gas turbine engines.

In at least some known rotatable machines for example, a gas turbine engine, turbine blade and/or nozzle temperatures have to be limited to ensure safe operation of the gas turbine engine and to ensure desired life for engine components. However, because of the adverse environments where these components operate, the temperatures are not measurable using thermocouples or RTDs, the traditional techniques for measuring gas path temperatures.

One known technique used on current production engines involves measuring exhaust gas temperature (EGT) downstream of the high-pressure turbine components at a location cool enough for a temperature probe to survive. This technique is prone to sampling problems, thermal lags in the probes, and errors in correlating the measured gas temperature to the desired metal temperature upstream. Moreover, as gas-path temperatures increase, probe life is reduced and cost increases. A second measurement technique uses a pyrometer to measure the metal temperature of interest. This technique is expensive and is subject to problems with line of sight, lens fogging, and sensing system unreliability.

BRIEF DESCRIPTION OF THE INVENTION

In one embodiment, an engine controller system includes an engine model programmed to receive engine operating condition values from a plurality of sensors positioned on an engine. The engine model is programmed to determine a plurality of engine operating parameter values wherein at least some of the determined engine operating parameter values correspond to the engine operating condition values received from the plurality of sensors. The system further includes a comparator configured to compare the determined operating parameter values to the engine operating condition values received from the plurality of sensors. The system also includes a processor configured to compare the determined operating parameter values to a predetermined allowable range for the operating parameter and control the operation of the engine to facilitate at least one of returning the determined operating parameter to the predetermined allowable range and maintaining the determined operating parameter within the predetermined allowable range, outputting the determined operating parameter values to a user, and/or generating maintenance requests based on the comparison.

In another embodiment, a method of controlling the operation of an engine includes receiving data from a plurality of sensors associated with corresponding sensed locations on the engine, applying the received data to a model stored in a computer wherein the computer model is configured to simulate an operation of the engine. The method also includes determining an operating parameter of the engine based on an output from the computer model, comparing the determined operating parameter to a predetermined allowable range for the operating parameter, and controlling the operation of the engine to facilitate at least one of returning the determined operating parameter to the predetermined allowable range and maintaining the determined operating parameter within the predetermined allowable range, output the determined operating parameter values to a user, and/or generate maintenance requests based on the comparison.

In yet another embodiment, a system for controlling the operation of a gas turbine engine includes an engine model having at least one input to receive engine operating conditions, the engine model configured to determine a plurality of gas turbine engine operating parameter values. The system also includes a comparator configured to compare the determined operating parameter values to the received sensor values, and a processor unit programmed to update the model using the comparison. The processor is also configured to compare the determined operating parameter values to a predetermined allowable range for the operating parameter, and control the operation of the gas turbine engine to facilitate at least one of returning the determined operating parameter to the predetermined allowable range and maintaining the determined operating parameter within the predetermined allowable range, output the determined operating parameter values to a user, and/or generate maintenance requests based on the comparison.

BRIEF DESCRIPTION OF THE DRAWINGS

FIGS. 1-6 show exemplary embodiments of the method and systems described herein.

DETAILED DESCRIPTION OF THE INVENTION

The following detailed description illustrates embodiments of the invention by way of example and not by way of limitation. It is contemplated that the invention has general application to analytical and methodical embodiments of determining operating parameters of equipment using sensors at locations remote from the location of interest in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
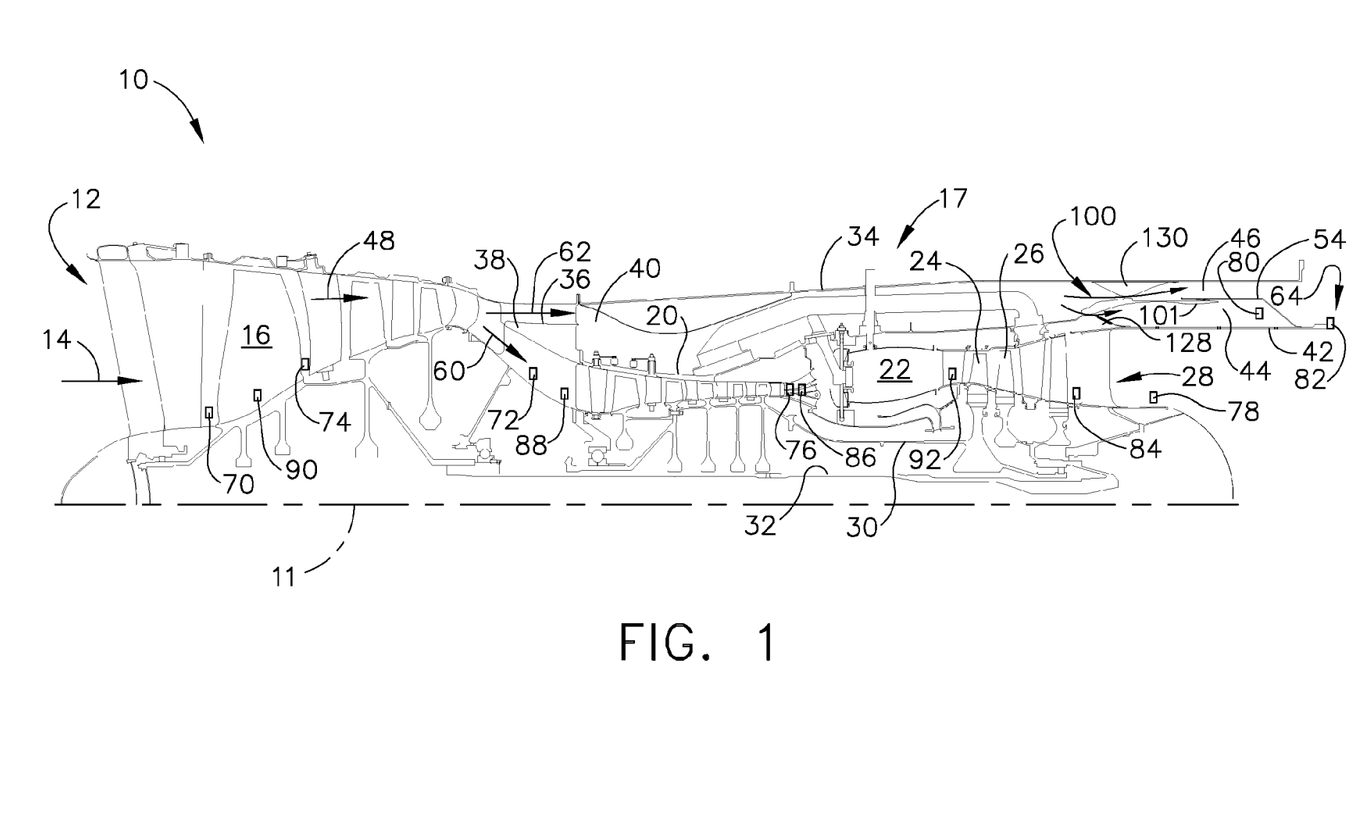
FIG. 1 is a schematic illustration of an exemplary variable cycle gas turbine engine in accordance with an exemplary embodiment of the present invention.

FIG. 1 is a schematic illustration of an exemplary variable cycle gas turbine engine 10 having a longitudinal centerline 11. Gas turbine engine 10 includes an annular inlet 12 for receiving ambient air 14 followed in axial flow relationship by a fan assembly 16, a core gas turbine engine 17 that includes a high pressure compressor (HPC) 20, a combustor 22, and a high-pressure turbine (HPT) 24, a low pressure turbine (LPT) 26 and an augmentor 28. HPT 24 powers HPC 20 through a first shaft 30. LPT 26 powers fan assembly 16 by a second shaft 32. Engine 10 further includes an outer casing 34 which is spaced from an inner casing 36 including a forward section 38 of inner casing 36 defining a bypass duct 40. In the exemplary embodiment, augmentor 28 includes a diffuser liner 42.

In the exemplary embodiment, gas turbine engine 10 also includes a valve assembly 100 that is coupled within bypass duct 40. More specifically, valve assembly 100 is positioned to facilitate separating bypass duct 40 into a radially inner bypass duct 44 and a radially outer bypass duct 46. More specifically, in the exemplary embodiment, inner bypass duct 44 and outer bypass duct 46 are aligned substantially concentrically. Accordingly, and in the exemplary embodiment, fan bypass flow 48 entering bypass duct 40 is divided into an inner bypass flow 50 and an outer bypass flow 52. Moreover, in the exemplary embodiment, valve assembly 100 facilitates regulating the volume of inner bypass flow 50 that is channeled through inner bypass duct 44 and the volume of outer bypass flow 52 that is channeled through outer bypass duct 46.

In the exemplary embodiment, a separation liner 54 contacts a tail portion 101 of valve assembly 100 and is coupled to diffuser liner 42 to facilitate channeling inner bypass flow 50 through inner bypass duct 44. Furthermore, separation liner 54 also facilitates channeling outer bypass flow 52 through outer bypass duct 46. A seal 56 extends between valve tail 101 and separation liner 54 to facilitate reducing leakage of outer bypass flow 52 into inner bypass duct 44.

During operation, air entering engine assembly 10 through inlet 12 is compressed by fan assembly 16. The flow of compressed air exiting fan assembly 16 is split such that a first airflow portion 60 is channeled into core turbine engine 17 and a second airflow portion, or bypass air 62, is channeled through bypass duct 40. First airflow portion 60 is further compressed by high-pressure compressor 20 and is channeled to combustor 22. Airflow discharged from combustor 22 drives rotating turbines 24 and 26 prior to being discharged from engine 10 through an exhaust 64.

In the exemplary embodiment, engine 10 includes a plurality of sensors, which monitor engine operation and input real-time actual engine sensor data during engine operation to engine model (not shown in FIG. 1). In one embodiment, the sensors monitor engine rotor speeds, engine temperatures, and engine pressures. Ambient flight condition data is also input to the engine model. Ambient flight condition data input includes, but is not limited to, ambient temperature, ambient pressure, aircraft mach number, and engine power setting parameters such as fan speed or engine pressure ratio. Exemplary sensor locations include but are not limited to a fan inlet temperature sensor 70, a compressor inlet total pressure sensor 72, a fan discharge static pressure sensor 74, a compressor discharge static pressure sensor 76, an exhaust duct static pressure sensor 78, an exhaust liner static pressure sensor 80, a flame detector 82, an exhaust gas temperature sensor 84, a compressor discharge temperature sensor 86, a compressor inlet temperature sensor 88, a fan speed sensor 90, and a core speed sensor 92.

In the exemplary embodiment, gas turbine engine 10 is a military jet engine such as a F110. In other embodiments, engine 10 may be other military engines of a commercial engine such as for example, but not limited to a CFM56 gas turbine engine or a CF34-10 gas turbine engine that are each commercially available from General Electric Company, Cincinnati, Ohio. It should be appreciated that in other embodiments, gas turbine engine 10 may be any gas turbine engine containing similar components, such as the F136 engine or a marine/industrial engine such as the LM6000, also available from the General Electric Company.

Figure 2:
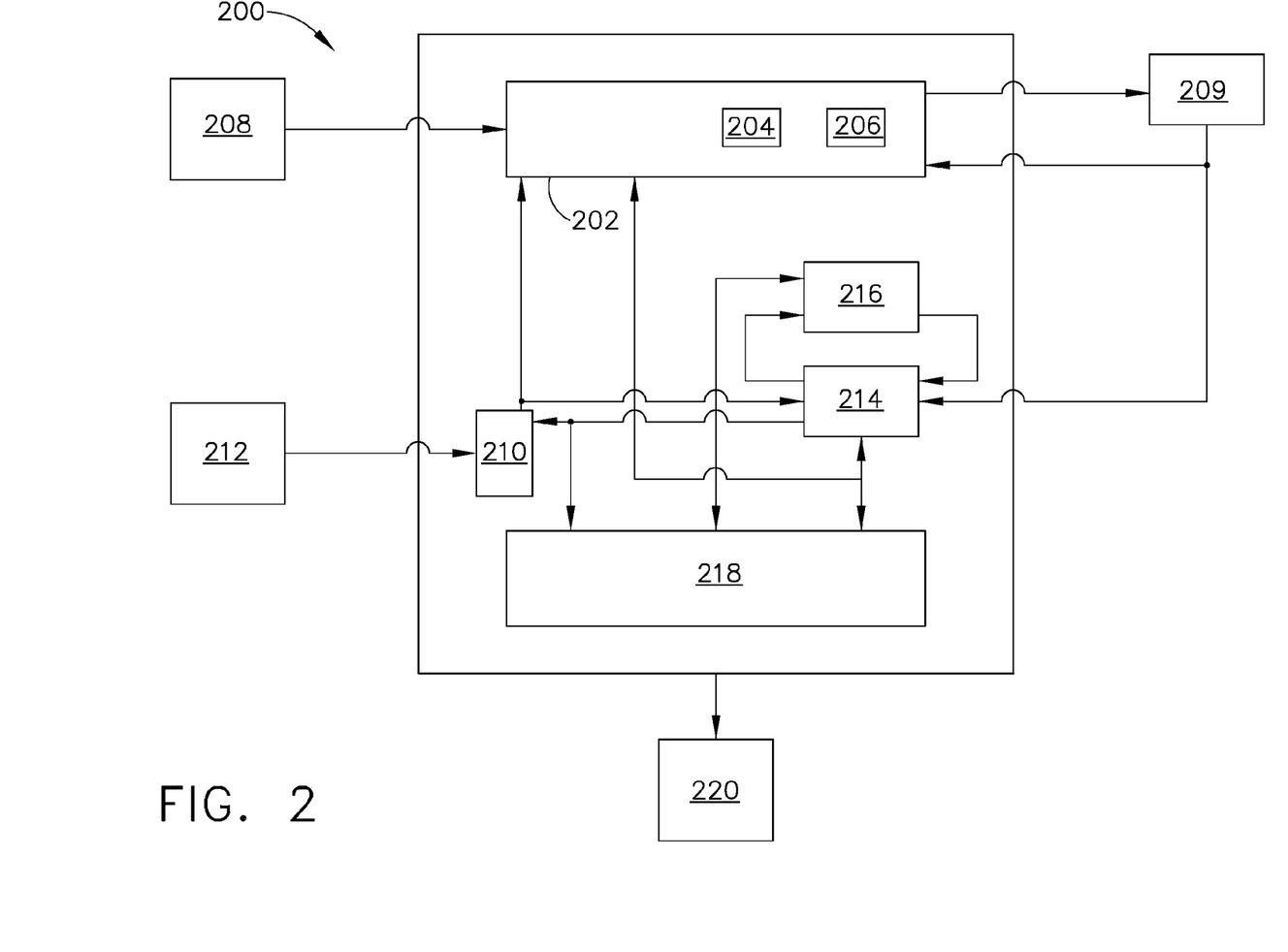
FIG. 2 is a schematic block diagram of a model-based engine control system in accordance with an exemplary embodiment of the present invention.

FIG. 2 is a schematic block diagram of a model-based engine control system 200 in accordance with an exemplary embodiment of the present invention. System 200 includes control logic 202 which may include a processor 204 and a memory unit 206. Control logic 202 is communicatively coupled to a command input module 208 configured to receive commands from a plurality of command input sources such as but not limited to a pilot, an autopilot, a fly-by-wire system, and a remote command system. Control logic 202 is also communicatively coupled to actuators 209 on engine 10. Control logic 202 is configured to transmit motion commands to actuators 209 and to receive actuator position information from actuators 209. Control logic 202 is also communicatively coupled to an input signal processing module 210 that is configured to receive sensor values from a plurality of sensors positioned on engine 10 and positioned in other locations offboard engine 10. Input signal processing module 210 is configured to monitor the operation and output values of sensors 212 and to select the combination of sensors 212 that may provide a most accurate representation of the operation on engine 10 and the other monitored systems and components. For example, an operating parameter of engine 10 may be monitored by a plurality of sensors. If one or more of the plurality of sensors fails or otherwise provides an erratic output or an output that is determined to be inaccurate, input signal processing module input signal processing module 210 can disable the input from the defective sensor and recombine the outputs from the remaining sensors monitoring the operating parameter to provide an input to control logic 202 for that operating parameter that is less robust because of the reduced number of sensors used to produce the input, but the input is more accurate because only the sensors providing accurate outputs are used to generate the input.

An engine model 214 is used to estimate sensed parameters, such as rotor speeds, temperatures, and pressures, as well as computed parameters such as thrust, airflows, stall margins, and turbine inlet temperature. The computed parameters are based on for example, but not limited to environmental conditions, power setting parameters, and actuator positions input into engine model 214. In the exemplary embodiment, engine model 214 is a physics-based aerothermodynamics model. In another embodiment, engine model 214 is a regression-fit model.

In the exemplary embodiment, engine model 214 is a Component Level Model (CLM) because each component, for example, inlet 12, ambient air 14, fan assembly 16, core gas turbine engine 17 including HPC 20, combustor 22, and HPT 24, LPT 26 and augmentor 28 within engine model 214 is individually modeled and then assembled into a specific engine model, such as physics-based engine model. Engine model 214 is programmed to represent a fast-running transient engine cycle that accounts for flight conditions, control variable inputs, and high-pressure compressor bleed. Further, engine model 214 includes parameters such as engine component efficiencies and flows which may be adjusted or tuned. These parameters can be modified using a parameter estimation algorithm, thereby modifying the model of a nominal or average engine to the model of a specific engine.

Engine model 214 is sensitive to flight conditions, control variable inputs, and high-pressure compressor bleed. The quality parameters for engine model 214 comprise flow and efficiency modifiers for each major rotating component. Such quality parameters may be embodied as constants of a polynomial expression defining each components response to one or more inputs. In the exemplary embodiment, the polynomial constants are derived using test data. Test data is measured during operation which fairly represents the environmental and application requirements of the engine for which the constants are derived. Alternatively, the test data may comprise exhaust temperatures derived from a simulation of engine 10.

Each of the fan assembly 16, compressor 20, HP turbine 24, and LP turbine 26, has a flow modifier and an efficiency modifier. The quality parameters are based on the sensed engine component parameters described above. These quality parameters can be adjusted from their nominal values, thereby affecting the model calculations. Proper manipulation of these quality parameters permits the model to simulate the behavior of a particular engine more precisely, to take into account the effects of manufacturing variations between engines, engine deterioration, or damaged engine parts. Adjustment of the quality parameters allows for a better match of model-determined sensor values to the received engine sensor values. Additionally, the physics based model 10 includes components and senses parameters associated with air inlet 12, combustor 22, and bypass duct 40.

Engine model 214 is communicatively coupled to a tracking filter 216 configured to compare differences between operating parameters corresponding to sensed locations and the respective determined operating parameter for the same location. An optional tracking filter 216 adjusts parameters of model 214 to match the operating parameter values generated by sensors measuring an operating parameter and the respective operating parameter values that are determined by model 214. Tracking filter 216 ensures model 214 continuously represent engine 10 regardless of changes in component wear, component efficiency, and/or component failures.

A health monitoring and diagnostics module 218 is communicatively coupled to model 214 and tracking filter 216. In the exemplary embodiment, health monitoring and diagnostics module 218 receives data regarding the determined operating parameters or "virtual sensors" and model parameters from model 214. Health monitoring and diagnostics module 218 generates fault codes, advisories and maintenance orders 220 based on the received data.

Figure 3:
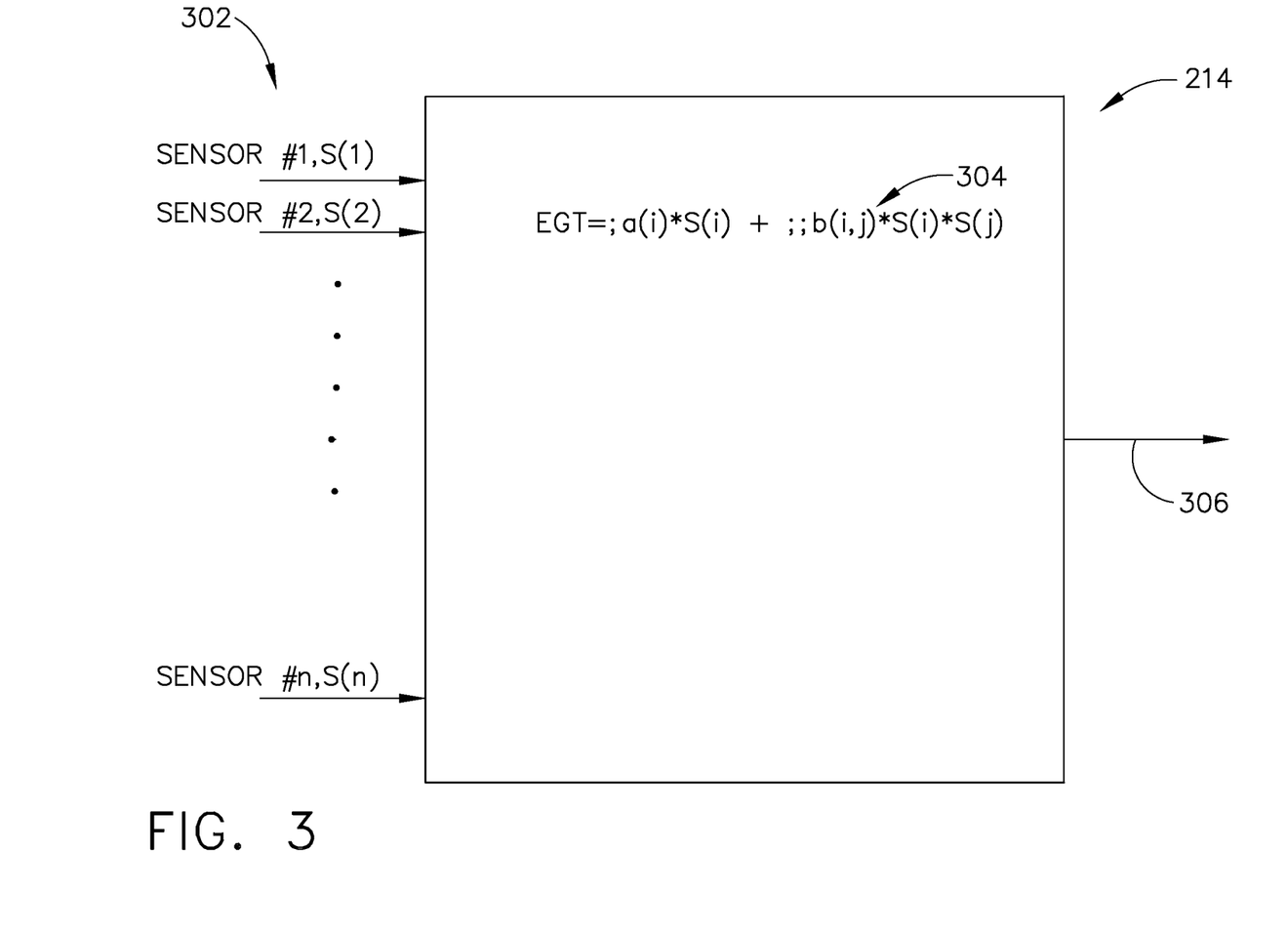
FIG. 3 is a schematic block diagram of an exemplary model that is regression-based in accordance with an exemplary embodiment of the present invention.

FIG. 3 is a schematic block diagram of an exemplary model 214 that is regression-based in accordance with an exemplary embodiment of the present invention. In the exemplary embodiment, model 214 is a regression-based model that determines output variable changes based on sensor inputs. Model 214 includes a curve fit to a plurality of input data points that may or in some cases may not relate directly to the determined output value. A mathematical relationship, for example, a polynomial expression that describes the fit curve is used to also determine the respective output. Parameters in the mathematical relationship, such as coefficients in the polynomial, are obtained using "training data." Training data includes a large number of cases, each case including a set of input parameters (X) and at least one output parameter of interest, such as turbine temperature (Y). Training data could be obtained from simulated engines (cycle models) that include new and deteriorated engines at multiple operating conditions with and without sensor biases. Training data can also be obtained from actual engine tests, provided that such tests include means of measuring or calculating the parameters that will be subsequently calculated by the regression model. For instance, the test engine may be instrumented with a rake containing a multiplicity of thermocouples at various circumferential and radial locations to measure turbine temperature such as LP turbine exit temperature T5. Such rakes are good for measurement in test cells but not suitable for implementation on a product engine due to cost and very short operating life.

In the exemplary embodiment, model 214 receives sensor inputs 302 from a plurality of sensors, S(1), S(2), . . . S(n). Model 214 includes a regression-based algorithm 304, for example, a polynomial equation that corresponds to at least one of inputs 302 to generate an output for one or more outputs 306. In other embodiments, algorithm 304 may include combinations of functions that describe output 306 based on inputs 302. A regression-based model 214 may be more useful than other algorithms when a causality of the relationship is not understood well enough to design for example, a physics-based model.

Figure 4:
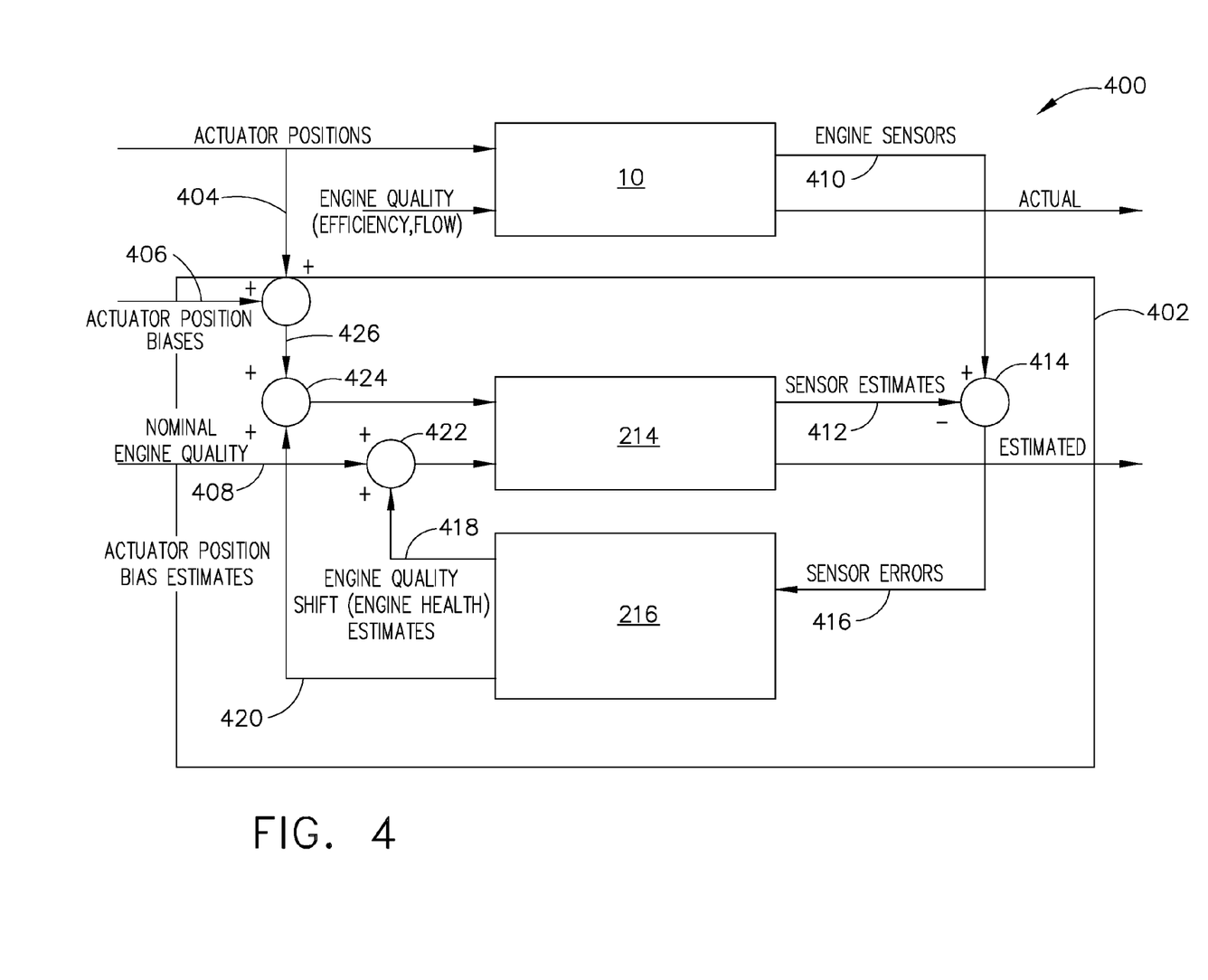
FIG. 4 is a schematic block diagram of an exemplary gas turbine engine system including a physics-based estimator in accordance with an exemplary embodiment of the present invention.

FIG. 4 is a schematic block diagram of an exemplary gas turbine engine system 400 including a physics-based estimator 402 in accordance with an exemplary embodiment of the present invention. In the exemplary embodiment, estimator 402 includes model 214 embodied as a physics-based model that determines output variable changes based on sensor input trend deviation based on the physics of engine 10. In some cases, the physics of engine 10 may be insufficient to generate a complete model. In such cases, the physics of engine 10 may be supplanted with experience-based model portions to ensure accuracy of model 214.

In the exemplary embodiment, estimator 402 includes model 214 and tracking filter 216. Estimator 402 receives engine actuator position information 404 biased by an unknown actuator position bias value 406, and nominal engine quality information 408. Engine sensor output values 410 from sensor positioned on engine 10 and virtual sensor output estimate values 412 are compared and the difference transmitted to tracking filter 216 as sensor errors 416. Sensor errors 416 are used by tracking filter 216 to generate an engine quality shift estimate 418 and an actuator bias shift estimate 420. Engine quality shift estimate 418 is combined 422 with nominal engine quality information 408 and transmitted to model 214. Actuator bias shift estimate 420 is combined 424 with an actuator shift estimate 426 to obtain actual engine quality estimate 423 and transmitted to model 214. Model 214 generates virtual sensor outputs for operating parameters that are not measured directly by actual sensors installed on engine 10. In the exemplary embodiment, model 214 relates known sensor outputs to expressions of the physics of engine 10 to generate outputs for operating parameters at locations where known sensors can not survive because of the extreme environment, where a sensor has failed, or where installation of a sensor is impractical or costly. Tracking filter 216 uses the sensor error signals 416 to tune the terms and parameters of model 214 to reduce sensor error 416. Tuning is performed using a parameter identification scheme such as for example, but not limited to proportional plus integral control loops, Kalman filters, or neural networks.

Figure 5:
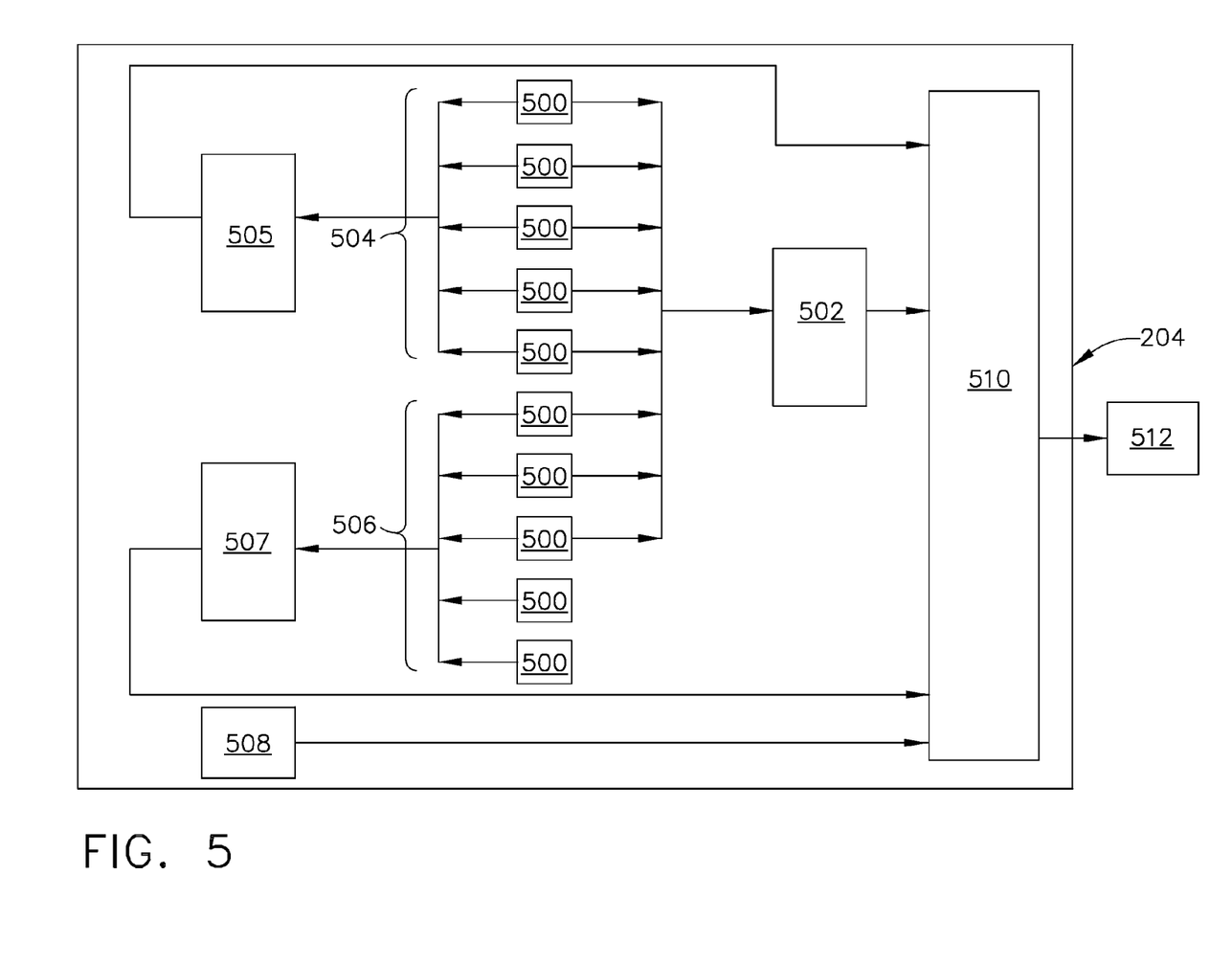
FIG. 5 is a schematic block diagram of a portion of the system shown in FIG. 2 in accordance with an exemplary embodiment of the present invention.

FIG. 5 is a schematic block diagram of a portion of system 200 (shown in FIG. 2) in accordance with an exemplary embodiment of the present invention. In the exemplary embodiment, system 200 includes a plurality of sensors 500 that are positioned on engine 10, proximate engine 10, or remote from engine 10. Model 214 determines the values of virtual sensors based on sensor outputs that relate to the virtual sensor value through model 214. Model 214 may be a regression-based model, a physics-based model, or other model such as but not limited to a map model, neural net model, or combinations of the above models.

In the exemplary embodiment, system 200 uses ten sensors 500 to determine an operating parameter 512 of engine 10 (shown in FIG. 1). Input signal processing module 210 monitors each of sensors 500 to verify proper operation. If operation of the ten sensors 500 is proper, system 200 determines operating parameter 512 using all ten of sensors 500 and a model 502. Model 502 may be a regression-based model, a physics-based model, or other model such as but not limited to a map model, neural net model, or combinations of the above models. If input signal processing module 210 detects a failure of one of sensors 500, system 200 uses a selectable subset of sensors 500 to determine operating parameter 512. For example, a first subset 504 of sensors 500 may be redundant of a second subset 506 of sensors 500 such that operating parameter 512 may be determined using sensors 500 and model 502, a first subset 504 and a model 505, and/or a second subset 506 and a model 507. In the exemplary embodiment, first subset 504 is mutually exclusive of second subset 506 such that a failure of a sensor 500 within first subset 504 does not affect the determination of operating parameter 512 by second subset 506 and its respective model 507 and vice-versa. A default model value 508 is provided for operating parameter 512 in the unlikely event that input signal processing module 210 detects failures in multiple sensors 500 spanning both subsets. A selection module 510 selects between the outputs of models 502, 505, 507, and default 508 using information on sensor failures from input signal processing module 210. Using all ten sensors 500 permits a more robust determination of operating parameter 512 while being able to alternatively use one of a plurality of subsets of sensors 500 permits greater reliability of the determination.

Figure 6:
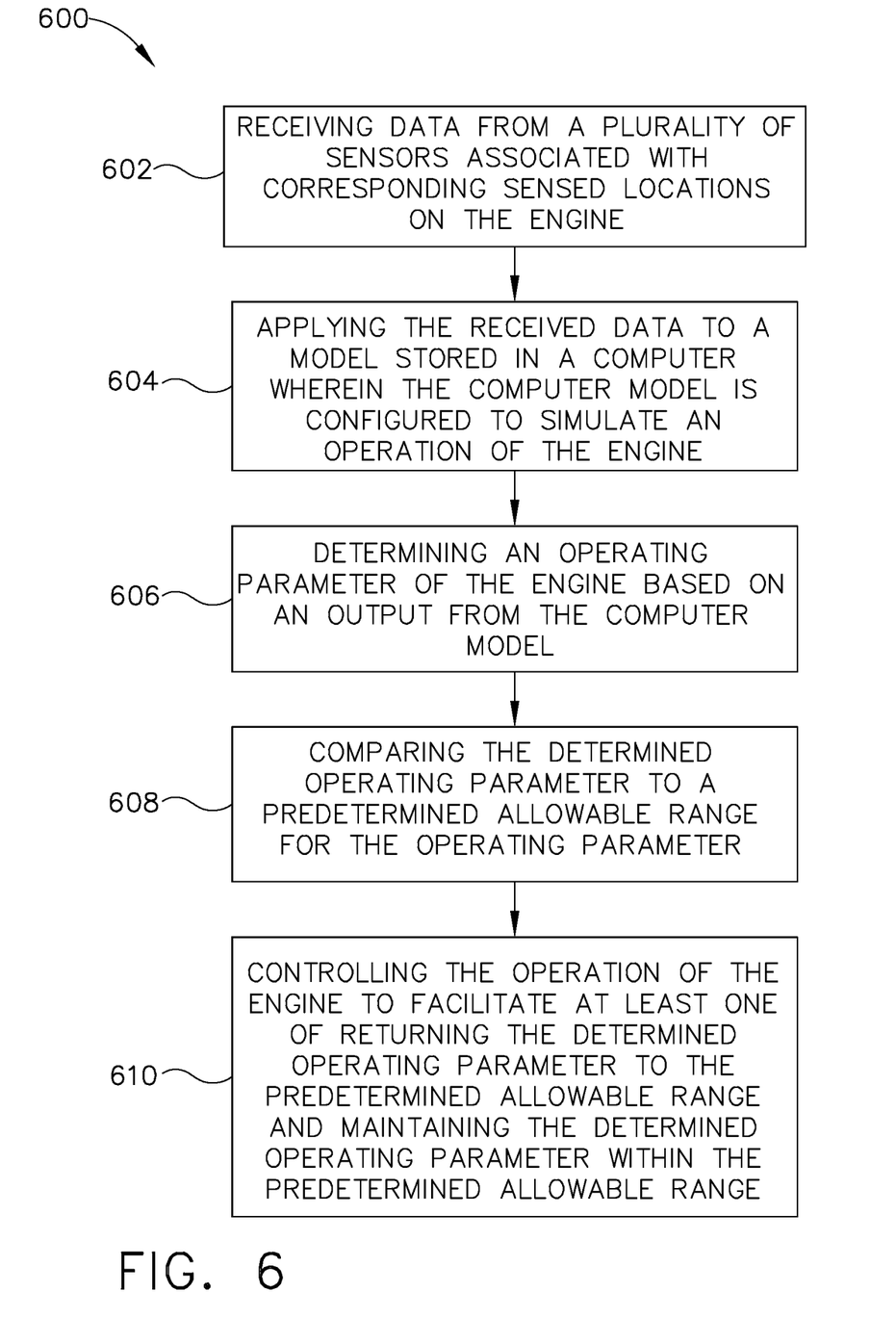
FIG. 6 is a flow diagram of an exemplary method of controlling the operation of the engine shown in FIG. 1.

FIG. 6 is a flow diagram of an exemplary method 600 of controlling the operation of engine 10 (shown in FIG. 1). In the exemplary embodiment, method 600 includes receiving 602 data from a plurality of sensors associated with corresponding sensed locations on the engine, applying 604 the received data to a model stored in a computer wherein the computer model is configured to simulate an operation of the engine, and determining 606 an operating parameter of the engine based on an output from the computer model. Method 600 also includes comparing 608 the determined operating parameter to a predetermined allowable range for the operating parameter and controlling 610 the operation of the engine to facilitate at least one of returning the determined operating parameter to the predetermined allowable range and maintaining the determined operating parameter within the predetermined allowable range, outputting the determined operating parameter values to a user, and/or generating maintenance requests based on the comparison.

As will be appreciated by those of ordinary skill in the art, though physics, experience, neural network, and regression-based models are discussed herein for the purpose of illustration, other modeling approaches may also be suitable for use in accordance with the present techniques.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory 206 for execution by processor 204. Memory 206 can be implemented using any appropriate combination of alterable, volatile, or non-volatile memory or non-alterable, or fixed, memory. The alterable memory, whether volatile or non-volatile, can be implemented using any one or more of static or dynamic RAM (Random Access Memory), a floppy disk and disk drive, a writeable or re-writeable optical disk and disk drive, a hard drive, and/or flash memory. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and/or disk drive. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is using a computer model to calculate an operating parameter of interest for example, downstream of the combustor based on other measured variables already available to the control system. These measured variables include actuator positions, rotor speeds, gas-path pressures, and temperature measurements for example, upstream of the combustor. The models can be regression-based or physics-based. Further, temperatures are calculated at several locations such as at specific locations on the HPT blade, HPT nozzle, LPT blade, or LPT nozzle and use the most limiting parameter in the engine control system. This method does not require a turbine temperature measurement, provides gas-path average or metal temperatures, does not suffer from temperature lag, and provides capability to adaptively limit control operation to the most limiting parameter. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems of controlling operating parameters such as but not limited to temperature in a machine, for example, but not limited to a gas turbine engine provides a cost-effective and reliable means determining virtual sensor outputs based on actual sensor outputs and a computer-based model of the machine. More specifically, the method and systems described herein facilitate managing a redundancy of the sensors used to determine the operating parameters. In addition, the above-described method and systems facilitate outputting actuator control signals to affect changes in the operation of the machine to maintain operating parameters within allowed limits and/or return operating parameters into allowed limits. As a result, the method and systems described herein facilitate controlling the operation of a machine in a cost-effective and reliable manner.

An exemplary method and systems for automatically and continuously determining the operating parameters of a machine in areas of the machine that are not directly monitored by sensors are described above in detail. The systems illustrated are not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. An engine controller system comprising:
    an engine model programmed to receive engine operating condition values from a plurality of sensors positioned on an engine, said engine model programmed to determine a plurality of engine operating parameter values from the received engine operating condition values that correspond to a location on the engine that is different from the sensor positions, wherein the determined operating parameter values represent a gas-path temperature within the engine; and
    a processor configured to:
        compare the determined operating parameter values to a predetermined allowable range for the operating parameter; and
        at least one of control the operation of the engine to facilitate at least one of returning the determined operating parameter to the predetermined allowable range and maintaining the determined operating parameter within the predetermined allowable range, and output the determined operating parameter values to a user.

2. An engine controller system in accordance with claim 1, wherein said processor is further configured to update parameters of the model that represent a health of the engine.

3. An engine controller system in accordance with claim 1, wherein said model comprises a polynomial expression for each of the determined operating parameter values.

4. An engine controller system in accordance with claim 1, wherein at least one of said plurality of engine operating parameter values is determined using at least one of an output from a set of sensors relatable to the operating parameter using the model, a first subset of the set of sensors, and a second subset of the set of sensors, the second subset of the set of sensors that are mutually exclusive of the first subset of sensors.

5. A method of controlling the operation of an engine, said method comprising:
    receiving data from a plurality of sensors associated with corresponding sensed locations on the engine;
    applying the received data to a model stored in a computer, the computer model configured to simulate an operation of the engine;
    determining an operating parameter of the engine based on an output from the computer model, wherein the determined operating parameter corresponds to a location on the engine that is different from the sensed locations, wherein the determined operating parameter values represent a gas-path temperature within the engine;
    comparing the determined operating parameter to a predetermined allowable range for the operating parameter; and
    at least one of controlling the operation of the engine to facilitate at least one of returning the determined operating parameter to the predetermined allowable range and maintaining the determined operating parameter within the predetermined allowable range, outputting the determined operating parameter values to a user.

6. A method in accordance with claim 5, wherein said applying further comprises applying the received data to at least one of a physics-based model, and a regression-based model.

7. A method in accordance with claim 6, wherein said applying the received data to at least one of a physics-based model and a regression-based model consists of applying the received data to a physics-based model, the physics-based model determines an operating parameter of the engine based on a system model using the physics of the engine.

8. A method in accordance with claim 6, wherein said applying the received data to at least one of a physics-based model and a regression-based model consists of applying the received data to a regression-based model, the regression-based model determines an operating parameter of the engine based on operating parameter changes based on at least one of historical sensor inputs and empirical sensor inputs.

9. A method in accordance with claim 5, wherein said determining further comprises determining a first operating parameter of the engine at least one of directly using one or more sensors associated with the operating parameter and indirectly using one or more sensors that are associated with other than the first operating parameter.

10. A method in accordance with claim 5, wherein said determining further comprises determining the operating parameter using a first set of sensors relatable to the operating parameter using the model.

11. A method in accordance with claim 10, wherein determining the operating parameter using a first set of sensors relatable to the operating parameter using the model comprises determining the operating parameter using a second set of sensors relatable to the operating parameter, the second set of sensors being a sub-set of the first set of sensors.

12. A method in accordance with claim 11, wherein determining the operating parameter using a second set of sensors relatable to the operating parameter, the second set of sensors being a sub-set of the first set of sensors comprises determining the operating parameter using a third set of sensors relatable to the operating parameter, the third set of sensors being a sub-set of the first set of sensors, the third set of sensors being a set of sensors that are mutually exclusive of the second set of sensors.

13. A method in accordance with claim 5, wherein further comprising:
    iteratively determining the operating parameter of the engine that corresponds to a location of one of the plurality of sensors wherein the operating parameter is of the same type as the sensor is capable of sensing;
    comparing the iteratively determined operating parameter to the received data corresponding to the iteratively determined operating parameter; and
    updating the model using the comparison.

14. A system for controlling the operation of a gas turbine engine comprising:
    an engine model having at least one input to receive engine operating conditions, said engine model configured to determine a plurality of gas turbine engine operating parameter values that correspond to a location on the engine that is different from a location of the received engine operating conditions, wherein the determined operating parameter values represent a gas-path temperature within the engine; and
    a processor unit programmed to:

compare the determined operating parameter values to a predetermined allowable range for the operating parameter; and at least one of control the operation of the gas turbine engine to facilitate at least one of returning the determined operating parameter to the predetermined allowable range and maintaining the determined operating parameter within the predetermined allowable range, output the determined operating parameter values to a user, and generate maintenance requests based on the comparison.

15. A system in accordance with claim 14, wherein said processor is further configured to update parameters of the model that represent a health of the gas turbine engine.

16. A system in accordance with claim 14, wherein said model comprises a polynomial expression for each of the determined operating parameter values.

17. A system in accordance with claim 14, wherein at least one of said plurality of gas turbine engine operating parameter values comprises an gas turbine engine operating parameter value that corresponds to a location on the engine where at least one of a sensor is absent at the location and a sensor at the location is defective.

18. A system in accordance with claim 14, wherein at least one of said plurality of gas turbine engine operating parameter values is determined using an output from a set of sensors relatable to the operating parameter using the model.

19. A system in accordance with claim 18, wherein the at least one of said plurality of gas turbine engine operating parameter values is determined using a first subset of the set of sensors.

20. A system in accordance with claim 19, wherein the at least one of said plurality of gas turbine engine operating parameter values is determined using a second subset of the set of sensors, the second subset being a subset of sensors that are mutually exclusive of the first subset of sensors.

* * * * *